United States Patent
Hu

(10) Patent No.: US 8,803,799 B2
(45) Date of Patent: Aug. 12, 2014

(54) SCREEN PROTECTION SYSTEM AND METHOD OF AN ELECTRONIC DEVICE

(75) Inventor: Ming-Xiang Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 365 days.

(21) Appl. No.: 13/221,864

(22) Filed: Aug. 30, 2011

(65) Prior Publication Data
US 2012/0249411 A1    Oct. 4, 2012

(30) Foreign Application Priority Data

Mar. 29, 2011    (CN) .......................... 2011 1 0076443

(51) Int. Cl.
*G09G 5/00*    (2006.01)
(52) U.S. Cl.
USPC ........... 345/156; 345/173; 345/169; 345/207; 345/107; 345/212; 713/324; 713/320; 702/99
(58) Field of Classification Search
None
See application file for complete search history.

(56) References Cited

U.S. PATENT DOCUMENTS

| | | | |
|---|---|---|---|
| 7,017,057 B2 * | 3/2006 | Magee et al. ................. | 713/320 |
| 2002/0080132 A1 * | 6/2002 | Dai et al. ...................... | 345/212 |
| 2003/0129964 A1 * | 7/2003 | Kohinata et al. .............. | 455/411 |
| 2010/0153764 A1 * | 6/2010 | Pratt et al. ..................... | 713/324 |
| 2010/0303259 A1 * | 12/2010 | Jia .................................. | 381/107 |
| 2011/0273378 A1 * | 11/2011 | Alameh et al. ................ | 345/173 |
| 2012/0019495 A1 * | 1/2012 | Chang et al. .................. | 345/207 |

* cited by examiner

*Primary Examiner* — Kent Chang
*Assistant Examiner* — Benjamin Morales Fernandez
(74) *Attorney, Agent, or Firm* — Novak Druce Connolly Bove + Quigg LLP

(57) ABSTRACT

In a screen protection system and method, a first operation temperature of an electronic device is detected from each of one or more first temperature sensors, and a first ambient temperature is detected from a second temperature sensor, when a display screen is activated. Once there is no operation on the electronic device, a timer is started timing. Once the electronic device is being operated, a duration is temporarily stored and the timer is reset. If the duration is equal to a screensaver time, a second operation temperature of the electronic device is detected from each of the first temperature sensors, and a second ambient temperature is detected from a second temperature sensor. The method further determines whether the electronic device is currently being held by a hand of a user, according to the above-mentioned temperatures. If the electronic device is not being held by a hand of the user, the display screen is controlled to be in an inactive state.

9 Claims, 3 Drawing Sheets

SCREEN PROTECTION SYSTEM AND METHOD OF AN ELECTRONIC DEVICE

BACKGROUND

1. Technical Field

The embodiments of the present disclosure relate to protection systems and methods, and more particularly to a screen protection system and method of an electronic device.

2. Description of Related Art

If an electronic device is inactive for a predetermined duration, a display screen of the electronic device can automatically turn off to save electricity power according to a protection program in the electronic device. However, the predetermined duration may not be appropriate for all applications of the electronic device. For example, when the user is reading a eBook, one page of the eBook may be not looked through if the predetermined duration is only 10 seconds. During reading of the one page of the eBook, user may only hold the electronic device in hand, and not operate the electronic device (e.g. pressing keystrokes of the electronic device). Therefore, the protection program may close the display screen automatically if the user does not operate the electronic device within the 10 seconds. If the user wants to continue reading, he or she may carry out an operation, such as operating one or more keystrokes of the electronic device, for example. It is not convenient to use the electronic device in such situations, and thoughtless operations may lead to more time being wasted on the electronic device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
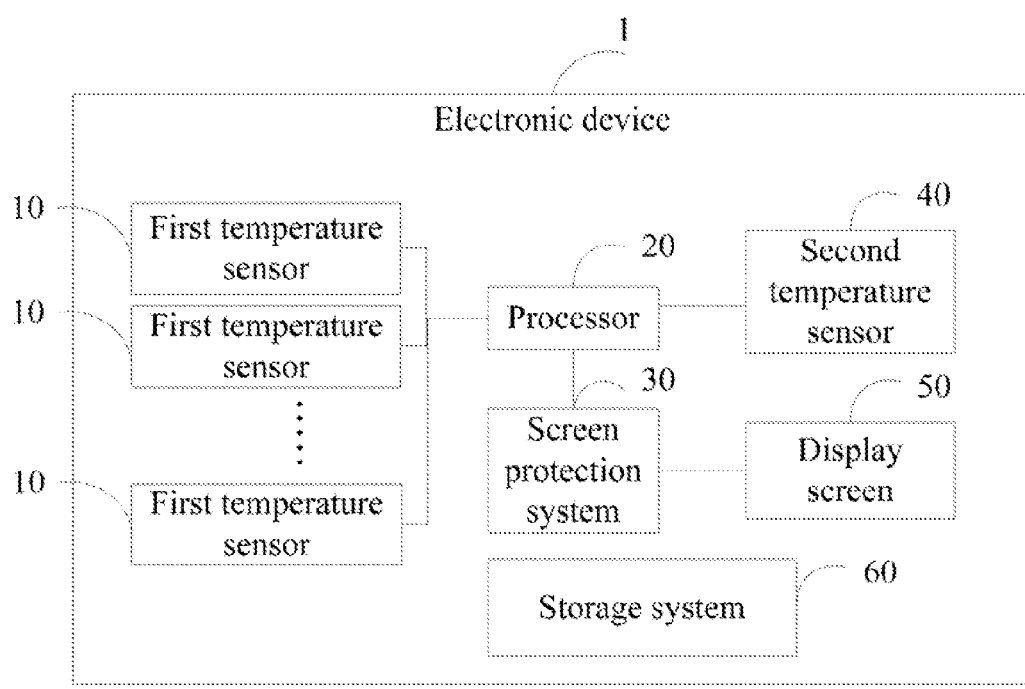
FIG. 1 is a schematic diagram of one embodiment of an electronic device including a screen protection system.

FIG. 1 is a schematic diagram of one embodiment of an electronic device 1 including a screen protection system 30. The electronic device 1 further includes a plurality of first temperature sensors 10, a processor 20, and a second temperature sensor 40. The screen protection system 30 may determine whether or not the electronic device 1 is being held in a hand of a user according to comparing an operation temperature detected from each of the first temperature sensors 10 with an ambient temperature detected from the second temperature sensor 40. The screen protection system 30 further prevents the operation of the screensaver and power-off-screen functions if the electronic device 1 is being held by a hand of a user.

Each of the first temperature sensors 10 is arranged around a plurality of positions of the electronic device 1 that are often in contact with the hand, or part of the hand, of a user, and detects the operation temperature of each position. For example, the positions may be at the back of the electronic device 1 that are often held in a hand to be operated. In one embodiment, the number and the positions of the first temperature sensors 10 can be set according to the structure of the electronic device 1 and the placement on the electronic device of the fingers and palm of a normal human being. The second temperature sensor 40 is located at a position where the ambient temperature can be most reliably detected, such as the position where hands of the user do not often be in contact with. The processor 20 executes one or more computerized codes and other applications of the electronic device 1, to provide functionality to the electronic device 1. In one embodiment, the processor 20 may read the operation temperature detected from each of the first temperature sensors 10 and the ambient temperature from the second temperature sensor 40 according to an analog-to-digital converter (not shown in FIG. 1) of the electronic device 1.

The electronic device 1 further includes a display screen 50 and a storage system 60. The display screen 50 may display data of the electronic device 1, such as images or text, for example. In one embodiment, the display screen 50 may be in an active state and an inactive state. When the display screen 50 is powered on to display data, which represents the display screen 50 is in the active state. When the display screen 50 is powered off, which represents the display screen 50 is in the inactive state. The storage system 60 may be a memory of the electronic device 1, or an external storage card, such as a smart media (SM) card, or a secure digital (SD) card.

Figure 2:
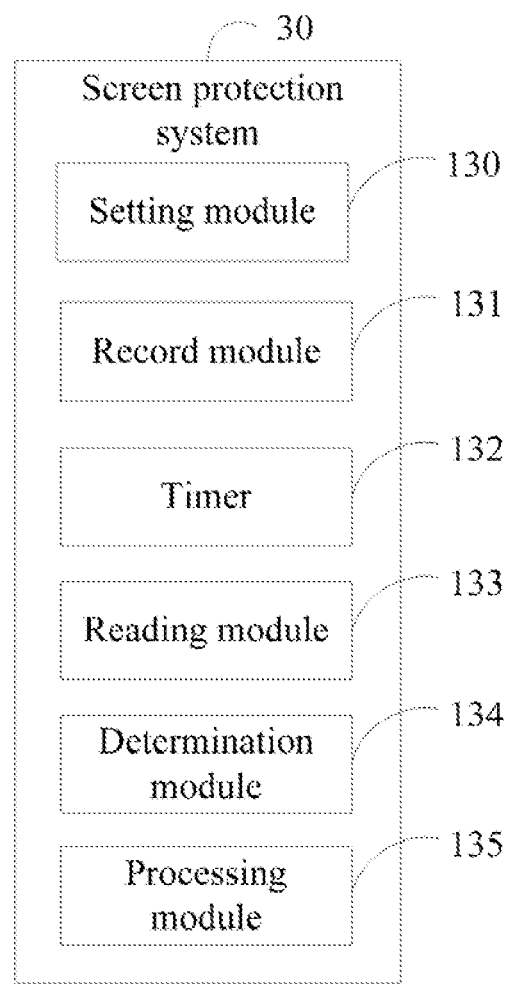
FIG. 2 is a block diagram of one embodiment of the screen protection system included in the electronic device of FIG. 1.

FIG. 2 is a block diagram of one embodiment of the screen protection system 30 included in the electronic device 1 of FIG. 1. In the embodiment, the screen protection system 30 may include a setting module 130, a record module 131, a timer 132, a reading module 133, a determination module 134, and a processing module 135. The modules 130-135 comprise computerized codes in the form of one or more programs that are stored in a storage system 60 of the electronic device 1. The computerized code includes instructions that are executed by at least one processor 20 to provide functions for the modules. Details of these operations are as follows.

The setting module 130 defines a screensaver time of the electronic device 1, and sets a standard temperature difference value for the electronic device 1. In one embodiment, the screensaver time is a period of time of non-activity on the screen after which the display screen 50 is powered off, and the screensaver time can be set to be 10 seconds, 20 seconds, for example. The standard temperature difference value is a standard temperature to determine whether the operation temperature from each of the first temperature sensors 10 and the ambient temperature from the second temperature sensor 40 are changed. The standard temperature difference value can be set 1 degree C., 2 degrees C., for example. The screensaver time and the temperature difference value may be set according to actual requirements or habits from the user.

The setting module 130 may further sets an allowable number of the first temperature sensors 10. The allowable number of first temperature sensors 10 may be is set according to the number of the first temperature sensors 10. The allowable number is equal to or less than the total number of the first temperature sensors 10. For example, if the number of the first temperature sensors 10 is five, the allowable number can be set to be three.

When the display screen 50 is activated to be in the active state, the record module 131 records a first operation temperature of a position from each of the first temperature sensors 10 and records a first ambient temperature from the second temperature sensor 40. In one embodiment, when it is determined that the electronic device 1 is being operated while handholding by the hands, the display screen 50 is deemed activated for the purposes of the method. Because the electronic device 1 is handheld, each of the first operation temperature is greater than the first ambient temperature. That is, a difference value between each of the first operation temperatures and the first ambient temperature is greater than the standard temperature difference value.

The timer 132 starts timing when the electronic device 1 is not being operated (e.g., in an inactive state or where the electronic device 1 is displaying data but not being actively operated). While in the process of timing, once the electronic device 1 is operated, a duration of the timer 132 is stored temporarily and the timer 132 is reset.

The determination module 134 determines whether the duration is equal to the screensaver time. In one embodiment, if the duration is stored temporarily and the timer 132 is reset, the determination module 134 reads the duration stored temporarily and determines whether the duration is equal to the screensaver time.

If the duration is equal to the screensaver time, the reading module 133 obtains a second operation temperature of the position from each of the first temperature sensors 10, and obtains a second ambient temperature from the second temperature sensor 40.

The determination module 134 further determines whether the electronic device 1 is currently being held by a hand of the user, according to the second operation temperatures, the second ambient temperature, the first operation temperatures, and the first ambient temperature. In one embodiment, a first difference value is defined as the difference between the first ambient temperature and the second ambient temperature. A second difference value is defined as the difference between each of the first operation temperatures and each of the corresponding second operation temperatures. A third difference value is defined as the difference between each of the second operation temperatures and the second ambient temperature.

The determination module 134 determines that the electronic device 1 is being held by a hand of the user, if the first difference value is less than or equal to the standard temperature difference value and at least allowable number of the second difference values are less than or equal to the standard temperature difference value. The determination module 134 determines that the electronic 1 is not being held by a hand of the user, if the first difference value is less than or equal to the standard temperature difference value, and if at least allowable number of the second difference values are greater than the standard temperature difference value.

The determination module 134 further determines that the electronic device 1 is being held by a hand of the user, if the first difference value is greater than the standard temperature difference value and if at least allowable number of the third difference values are less than or equal to the standard temperature difference value. The determination module 134 further determines that the electronic device 1 is not being held by a hand of the user, if the first difference value is greater than the standard temperature difference value and at least allowable number of the third difference values are greater than the standard temperature difference value.

If the electronic device 1 is not being held by a hand of the user, the processing module 135 controls the display screen 50 to be in the inactive state, such as powering off a backlight of the display screen 50. If the electronic device 1 is being held by a hand of the user, the processing module 135 maintains the display screen 50 continually to be in the active state.

Figure 3:
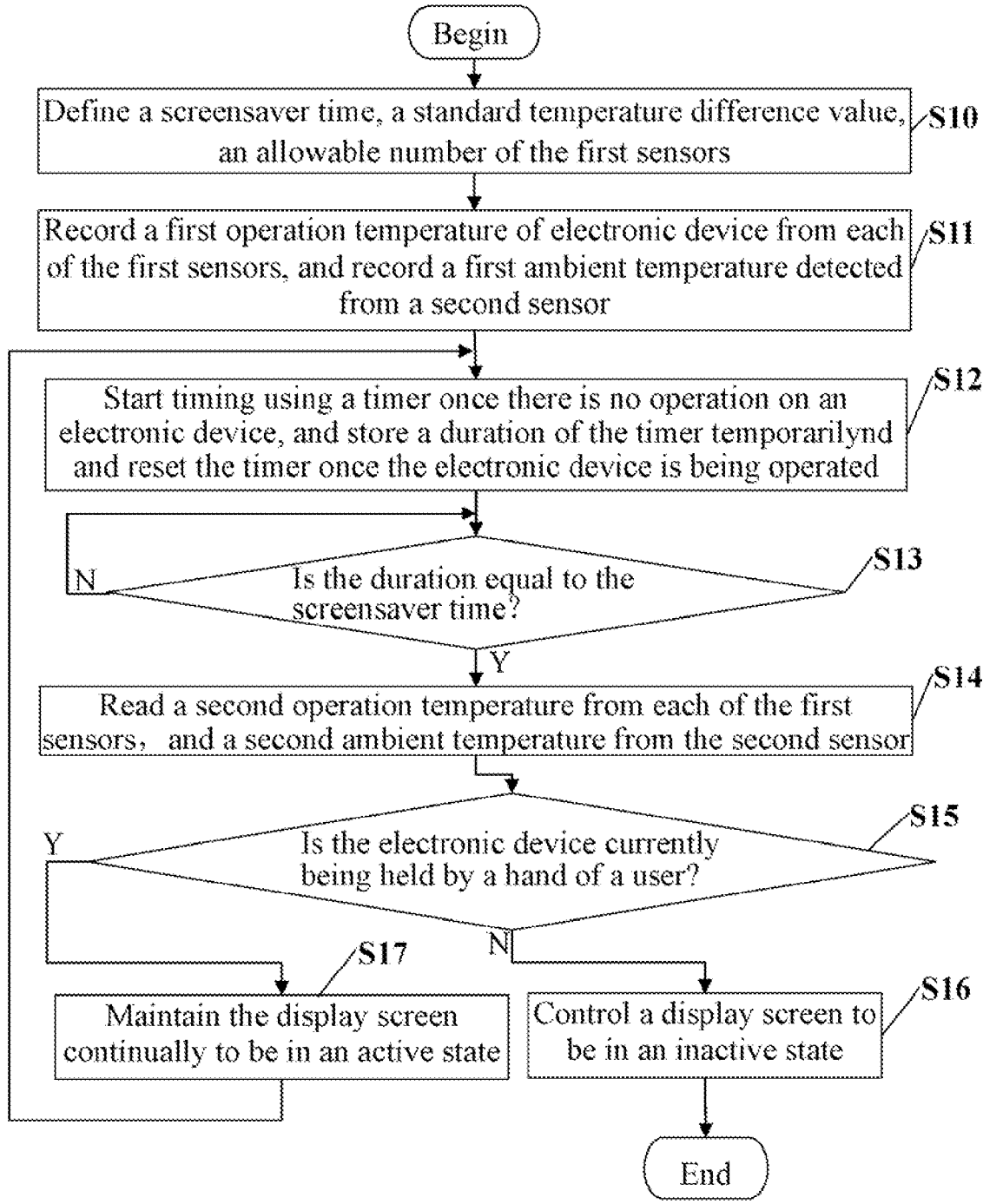
FIG. 3 is a flowchart of one embodiment of a screen protection method for an electronic device, such as, that of FIG. 1.

FIG. 3 is a flowchart of one embodiment of a screen protection method of the electronic device 1, such as, that of FIG. 1. Depending on the embodiment, additional blocks may be added, others deleted, and the ordering of the blocks may be changed.

In block S10, the setting module 130 defines a screensaver time of the electronic device 1, a standard temperature difference value for the electronic device 1, and sets an allowable number of the first temperature sensors 10. The allowable number is equal to or is less than the total number of the first temperature sensors 10.

In block S11, when the display screen 50 is activated to be in the active state, the record module 131 records a first operation temperature of each position detected from each of first temperature sensors 10, and records a first ambient temperature from the second temperature sensor 40. In one embodiment, when it is determined that the electronic device 1 is being operated while handholding by the hands, the display screen 50 is deemed activated for the purposes of the method.

In block S12, the timer 132 starts timing time, once there is no operation on the electronic device 1. While in the process of timing, once the electronic device 1 has been operated, a duration of the timer 132 is stored temporarily and the timer 132 is reset to zero.

In block S13, the determination module 134 determines whether the duration is equal to the screensaver time. If the duration is equal to the screensaver time, block S14 is implemented. Otherwise, if the duration is not equal to the screensaver time, block S13 is repeated.

In block S14, the reading module 133 reads a second operation temperature of the position detected from each of the first temperature sensors 10, and reads a second ambient temperature detected from the second temperature sensor 40.

In block S15, the determination module 134 further determines whether the electronic device 1 is currently being held by a hand of the user according to the second operation temperatures, the second ambient temperature, the first operation temperatures, and the first ambient temperature. If it is determined that the electronic device 1 is being held by a hand of the user, block S16 is implemented. Otherwise, if the electronic device 1 is not being held by a hand of the user, block S17 is implemented.

In the block S15, the determination module 134 determines whether the electronic device 1 is being held by a hand of the user by the following methods. In one embodiment, a first difference value, a second difference value, and a third difference value are as respectively defined in paragraph [0017] above. The determination module 134 determines that the electronic device 1 is being held by a hand of the user, if the first difference value is less than or equal to the standard temperature difference value and at least allowable number of the second difference values are less than or equal to the standard temperature difference value. The determination module 134 determines that the electronic 1 is not being held by a hand of the user, if the first difference value is less than or equal to the standard temperature difference value and at least allowable number of the second difference values are greater than the standard temperature difference value. The determination module 134 determines that the electronic device 1 is being held by a hand of the user, if the first difference value is greater than the standard temperature difference value and at least allowable number of the third difference values are less than or equal to the standard temperature difference value. The determination module 134 determines that the electronic device 1 is not being held by a hand of the user, if the first difference value is greater than the standard temperature difference value and at least allowable number of the third difference values are greater than the standard temperature difference value.

In block S16, the processing module 135 controls the display screen 50 to be in the inactive state, such as powering off a backlight of the display screen 50.

In block S17, the processing module 135 maintains the display screen 50 continually to be in the active state, and block S12 is repeated.

The described exemplary embodiments are merely possible examples of implementations, and have been set forth for a clear understanding of the principles of the present disclosure. Many variations and modifications may be made to the described embodiment without departing substantially from the spirit and principles of the present disclosure. All such modifications and variations are intended to be included within the scope of this disclosure and the described embodiments, and the present disclosure is protected by the following claims.

What is claimed is:

1. An electronic device, comprising:
   one or more first temperature sensors, a second temperature sensor, a display screen;
   a storage system and at least one processor;
   one or more programs that are stored in the storage system and are executed by the at least one processor, the one or more programs comprising:
   a setting module that defines a screensaver time for the electronic device, sets a standard temperature difference value for the electronic device, and sets an allowable number of the one or more first temperature sensors;
   a record module that records a first operation temperature of the electronic device detected from each of the one or more first temperature sensors, and records a first ambient temperature detected from the second temperature sensor, when the display screen is activated to be in an active state;
   a timer that starts timing once the electronic device is not operated, and stores a duration of the timer temporarily and resets the timer once the electronic device is being operated;
   a reading module that obtains a second operation temperature of the electronic device detected from each of the one or more first temperature sensors, and obtains a second ambient temperature detected from the second temperature sensor, upon the condition that the duration is equal to the screensaver time;
   a determination module that determines whether the electronic device is currently being held by a hand of a user according to the first operation temperatures, the first ambient temperature, the second operation temperatures and the second ambient temperature, the electronic device being determined to be held by a hand of the user, when a first difference value is less than or equal to the standard temperature difference value and at least one allowable number of second difference values are less than or equal to the standard temperature difference value, and the electronic device being determined not to be held by a hand of the user, when the first difference value is less than or equal to the standard temperature difference value and at least one allowable number of the second difference values are greater the standard temperature difference value, the first difference value representing a difference between the first ambient temperature and the second ambient temperature, and each of the second difference values representing a difference between each of the first operation temperatures and each of the corresponding second operation temperatures;
   a processing module that controls the display screen to be in an inactive state, upon the condition that the electronic device is not held by a hand of the user; and
   the processing module further continually maintains the display screen to be in the active state, upon the condition that the electronic device is held by the hand of the user.

2. The electronic device as claimed in claim 1, wherein the determination module further determines that the electronic device is being held by a hand of the user, if the first difference value is greater than the standard temperature difference value and at least one allowable number of third difference values are less than or equal to the standard temperature difference value, or determines that the electronic device is not being held by a hand of the user, if the first difference value is greater than the standard temperature difference value and at least one allowable number of the third difference values are greater than the standard temperature difference value, wherein each of the third difference values represents a difference between each of the second operation temperatures and the second ambient temperature.

3. The electronic device as claim in claim 1, wherein each of the one or more first temperature sensors is located at a position of the electronic device that is handheld by hands of the user, and the second temperature sensor is located at a position where the hands do not handhold.

4. A screen protection method of an electronic device, the electronic device comprising a display screen, one or more first temperature sensors and a second temperature sensor, the method comprising:
   defining a screensaver time for the electronic device, setting a standard temperature difference value of temperatures for the electronic device, and setting an allowable number of the one or more first temperature sensors;
   recording a first operation temperature of the electronic device detected from each of the one or more first temperature sensors, and recording a first ambient temperature detected from the second temperature sensor, when the display screen is activated to be in an active state;
   starting timing time once the electronic device is not operated, and storing a duration of the timer temporarily and resetting the timer once the electronic device is being operated;
   obtaining a second operation temperature of the electronic device detected from each of the one or more first temperature sensors, and obtaining a second ambient temperature detected from the second temperature sensor, upon the condition that the duration is equal to the screensaver time;
   determining whether the electronic device is currently being held by a hand of a user according to the first operation temperatures, the first ambient temperature, the second operation temperatures and the second ambient temperature, the electronic device being determined to be held by a hand of the user, if a first difference value is less than or equal to the standard temperature difference value and at least one allowable number of second difference values are less than or equal to the standard temperature difference value, and the electronic device being determined not to be held by a hand of the user, if the first difference value is less than or equal to the standard temperature difference value and at least one allowable number of the second difference values are greater than the standard temperature difference value, wherein the first difference value represents a difference between the first ambient temperature and the second ambient temperature, and each of the second difference values represents a difference between each of the first operation temperatures and each of the corresponding second operation temperatures;

controlling the display screen to be in an inactive state upon the condition that the electronic device is not being held by a hand of the user; and maintaining the display screen continually to be in an active state upon the condition that the electronic device is being held by a hand of the user.

5. The method as claimed in claim 4, wherein the determining step further comprises:

determining that the electronic device is being held by a hand of the user, if the first difference value is greater than the standard temperature difference value and at least one allowable number of third difference values are less than or equal to the standard temperature difference value, wherein each of the third difference values represents a difference between each of the second operation temperatures and the second ambient temperature;

determining that the electronic device is not being held by a hand of the user, if the first difference value is greater than the standard temperature difference value and at least one allowable number of the third difference values are greater than the standard temperature difference value.

6. The storage medium as claimed in claim 4, wherein each of the one or more first temperature sensors is located at a position of the electronic device that is handheld by hands of the user, and the second temperature sensor is located at a position where the hands do not handhold.

7. A non-transitory storage medium storing a set of instructions, the set of instructions capable of being executed by a processor of an electronic device, cause the electronic device to perform a screen protection method of the electronic device, the electronic device comprising a display screen, one or more first temperature sensors and a second temperature sensor, the method comprising:

defining a screensaver time for the electronic device, setting a standard temperature difference value of temperatures for the electronic device, and setting an allowable number of the one or more first temperature sensors;

recording a first operation temperature of the electronic device detected from each of the one or more first temperature sensors, and recording a first ambient temperature detected from the second temperature sensor, when the display screen is activated to be in an active state;

starting timing time a duration once the electronic device is not operated, and storing the duration temporarily and resetting the timer once the electronic device is being operated;

obtaining second operation temperatures of the electronic device detected from the one or more first temperature sensors, and obtaining a second ambient temperature detected from the second temperature sensor, upon the condition that the duration is equal to the screensaver time;

determining whether the electronic device is being held by a hand of a user, according to the first operation temperatures, the first ambient temperature, the second operation temperatures and the second ambient temperature, wherein the electronic device being determined to be held by a hand of the user, if a first difference value is less than or equal to the standard temperature difference value and at least one allowable number of second difference values are less than or equal to the standard temperature difference value, and the electronic device being determined not to be held by a hand of the user, if the first difference value is less than or equal to the standard temperature difference value and at least one allowable number of the second difference values are greater the standard temperature difference value, wherein the first difference value represents a difference between the first ambient temperature and the second ambient temperature, and each of the second difference values represents a difference between each of the first operation temperatures and each of the corresponding second operation temperatures;

controlling the display screen to be in an inactive state, upon the condition that the electronic device is not being held by a hand of the user; and maintaining the display screen continually to be in the active state, upon the condition that the electronic device is being held by a hand of the user.

8. The storage medium as claimed in claim 7, wherein the determining step further comprises:

determining that the electronic device is being held by a hand of the user, if a first difference value is greater than the standard temperature difference value and at least one allowable number of third difference values are less than or equal to the standard temperature difference value, wherein each of the third difference values represents a difference between each of the second operation temperatures and the second ambient temperature;

determining that the electronic device is not being held by a hand of the user, if the first difference value is greater than the standard temperature difference value and at least one allowable number of the third difference values are greater than the standard temperature difference value.

9. The storage medium as claimed in claim 7, wherein each of the one or more first temperature sensors is located at a position of the electronic device that is handheld by hands of the user, and the second temperature sensor is located at a position where the hands do not handhold.

* * * * *